June 14, 1927.
F. R. RHODES
WINDSHIELD ATTACHMENT
Filed Aug. 27, 1926
1,632,679
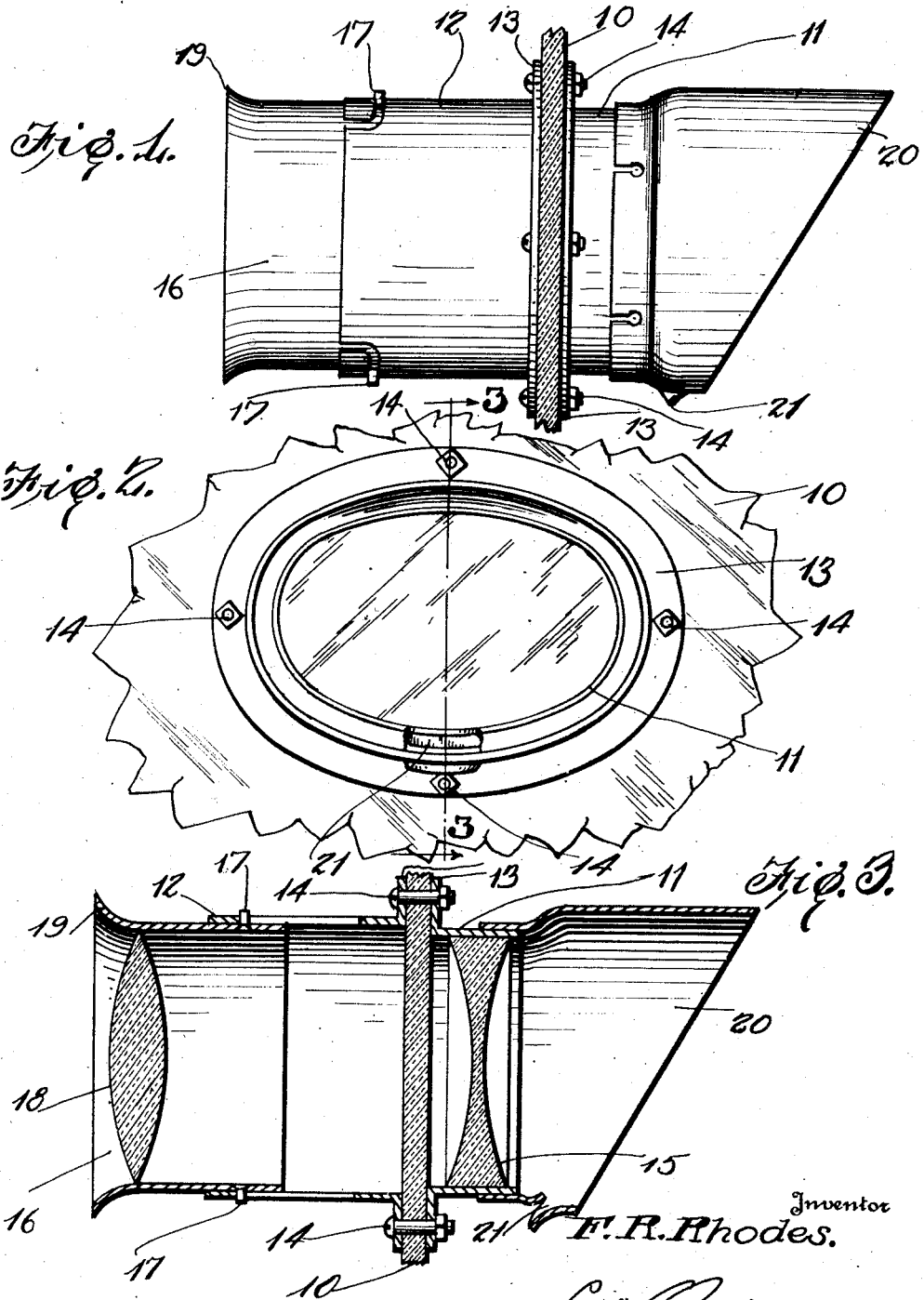

Patented June 14, 1927.

1,632,679

UNITED STATES PATENT OFFICE.

FAY R. RHODES, OF IOLA, KANSAS.

WINDSHIELD ATTACHMENT.

Application filed August 27, 1926. Serial No. 131,962.

This invention relates to windshield attachments, and has special reference to a telescopic attachment for windshields.

One important object of the invention is to improve the general construction of devices of this character, and to provide a windshield attachment arranged to afford the driver of an automobile a clear view of the whole road, even in times of storm and the like.

A second important object of the invention is to provide an improved telescopic windshield attachment so arranged that glare from approaching headlights will be eliminated.

A third important object of the invention is to provide such an attachment with an auxiliary part forming a rain, sun and light glare shield.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 1 is a section through a windshield showing the attachment in side elevation.

Figure 2 is a front view thereof.

Figure 3 is a section on the line 3—3 of Figure 2.

In the drawings illustrating the invention there is shown a windshield 10, and the attachment is applied to the windshield on the driver's side and consists of an outer tube 11 and an inner or rear tube 12, each provided with a flange 13. Through these flanges, which rest on the windshield 10, pass small bolts 14 which extend through holes in the windshield and secure the tubes 11 and 12 to the shield. Mounted in the front tube 11 is a double concave lens 15 which forms the object glass of the telescope. Slidable in the rear tube 12 is a tube 16 which is limited in movement by pins 17, carried by the tube 16 and passing through suitable slots in the tube 12. This tube 16 supports a double convex lens 18, forming the eye piece of the telescope. The tube 16 is provided with a flaring end 19 which assists in cutting off any glare from around the exterior of the tubes. Slidable on the front end of the tube 11 is a shade 20, the top of which projects further forward than the lower part. At the lower rear end of this shade there is provided an opening 21 with slightly curved edges to form a draft or escape opening for air entering the mouth of the tube or shade 20. This flow of air through the draft tube carries with its all particles of rain, snow or dust which entering the shade 20 would otherwise tend to collect on the front surface of the lens 15.

These tubes may be of any preferred shape, preferably are oval in form, as can be seen from the front elevation in Figure 2. Also, in order to afford a better grip of the shade 20 on the tube 11, the gripping portion of the shade is slit, as is usual in telescope sunshades, and the shade is made of spring material. Thus the shade may be removed when not needed in clear weather, and placed on the telescope in rainy or snowy weather, or at night.

In use the lens 18 is adjusted for focus by sliding the tube 16 relative to the tube 12. The driver then looks through the telescope. The double concave lens gathers the light rays from the objects on the road and condenses them within the tubes. The double convex lens magnifies the condensed image and brings it to normal size, thus making it very clear. Obviously, the windshield may have an opening cut therein corresponding in size to the tubes so that the light rays will not pass through the windshield. Also, while the device has here been shown with a perpendicular windshield, it may equally well be used with a slanting windshield, it being merely necessary to so shape the tubes that the flanges 13 will fit against the windshield while the axis of the telescope is horizontal.

There has thus been provided a simple and efficient device of the kind described and for the purpose specified.

It will be noted that this device can also be used on the front windows of railroad locomotive cabs, in which position it will greatly aid the engineer in seeing the track and signal conditions ahead in severe storms and snows.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination with a windshield, a telescope having front and rear tubes provided with flanges on their adjacent ends resting against the front and rear surfaces of the windshield, means to secure the flanges to the windshield, an object glass carried by the front tube, and an eye piece carried by the rear tube.

2. In combination with a windshield, a telescope having front and rear tubes provided with flanges on their adjacent ends resting against the front and rear surfaces of the windshield, means to secure the flanges to the windshield, an object glass carried by the front tube, and an eye piece carried by the rear tube, said eye piece being mounted for focusing movement toward and from the object glass.

3. In combination with a windshield, a telescope having front and rear tubes provided with flanges on their adjacent ends resting against the front and rear surfaces of the windshield, means to secure the flanges to the windshield, an object glass carried by the front tube, and a glass and storm shield detachably supported on the forward end of the front tube.

4. In combination with a windshield, a telescope having front and rear tubes provided with flanges on their adjacent ends resting against the front and rear surfaces of the windshield, means to secure the flanges to the windshield, an object glass carried by the front tube, and a glass and storm shield detachably supported on the forward end of the front tube, and provided with an air escape opening in its lower rear part.

In testimony whereof I affix my signature.

FAY R. RHODES.